Figures 1, 2:
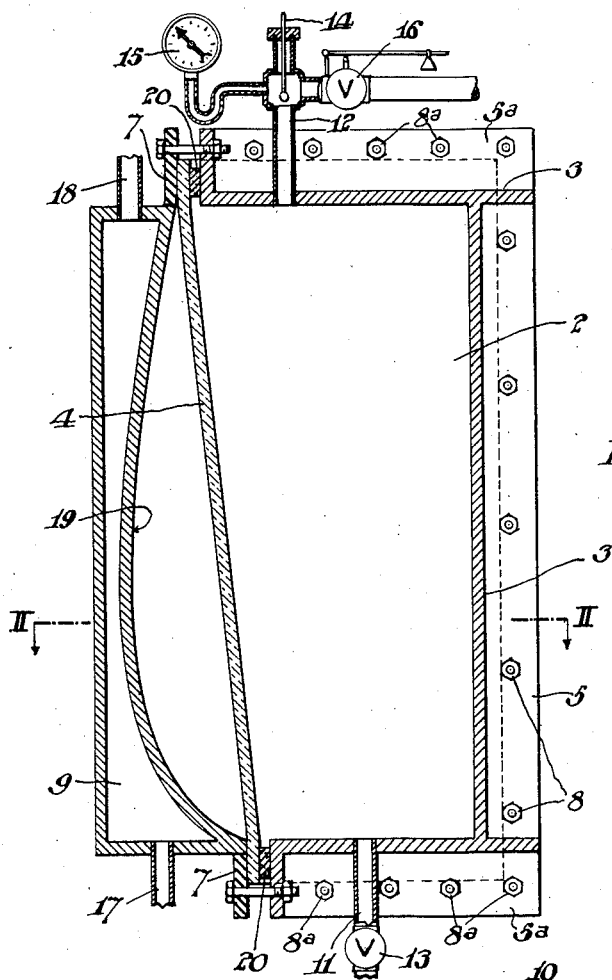

Jan. 3, 1939. E. L. HELWIG 2,142,445
METHOD OF SHAPING THERMOPLASTIC SHEETS
Filed Nov. 27, 1936

Inventor:
Edward L. Helwig,
By John F. Bergin
Attorney

Patented Jan. 3, 1939

2,142,445

UNITED STATES PATENT OFFICE 2,142,445

METHOD OF SHAPING THERMOPLASTIC SHEETS

Edward L. Helwig, Bristol, Pa., assignor to Röhm & Haas Company, Philadelphia, Pa.

Application November 27, 1936, Serial No. 112,923

3 Claims. (Cl. 18—56)

This invention relates to a method and apparatus for shaping transparent organic thermoplastic sheet material into objects having three-dimensional curved surfaces. More particularly it relates to a process and apparatus whereby this can be accomplished without marring the surface finish of the sheet material.

When transparent organic sheet material is used as a substitute for glass in such places as in windows or cockpit covers for aircraft, it is necessary that the surface be as highly polished and as smooth as that of plate glass. Otherwise, vision will be distorted and the proper control of the aircraft endangered. To place the necessary high polish on curved sheets of the thermoplastic sheet material after it is shaped is extremely difficult and expensive. For this reason common practice has been to produce the surface finish before shaping the sheet material.

The shaping has heretofore usually been accomplished by clamping the sheet across the opening of a negative mold, warming it to the softening point, and then pressing it against a positive mold to stretch the sheet to the desired shape. The pressure needed to stretch the sheet is considerable and must be transmitted from the positive mold to the sheet. The positive mold and sheet are consequently in very intimate contact and since the plastic sheet is near its softening point, the surface of the positive mold is impressed upon the plastic material. It is necessary, therefore, to have a highly polished and consequently very expensive positive mold, as otherwise the surface of the sheet will be roughened and marred by the mold surface.

Practically all of the surface marring is caused by the positive mold pressing against the inner side of the sheet as considerable pressure is required at this point. The outer surface is practically perfect as very little pressure is required to guide the material into the negative mold.

It has been known that thermoplastic sheet material can be shaped by blowing operations, wherein a heated fluid forces the sheet into a mold, and many patents have appeared utilizing this method of making such objects as balls, tumblers, inner tubes, etc. In all such processes, however, the object has been to transfer the mold texture to the surface of the thermoplastic material.

In my copending application S. N. 111,650, filed November 19, 1936, a method is proposed whereby that part of the mold against which the plastic material is pressed is free to move as soon as the plastic sheet comes in contact with the entire mold surface. In this manner the pressure exerted by the plastic sheet on the mold surface is maintained so low that there is no impression of the mold surface on the surface of the sheet.

It is an object of the present invention to provide a process and apparatus for shaping thermoplastic sheet material, utilizing fluid pressure without, however, transferring the texture of the mold surface to the sheet material even though the sheet is pressed against the mold by considerable pressure.

This is accomplished by clamping the sheet in a suitable mold, heating and expanding it by means of a hot fluid under the requisite pressure and cooling the outer surface of the sheet as soon as it comes in contact with the surface of the mold cavity. By cooling it far enough below the temperature at which it flows under the pressure being applied the outer surface is hardened sufficiently so that any slight imperfections in the mold surface are not impressed on the sheet. The cooling is effected by using a hollow mold block through which a cold liquid can be circulated thus keeping the surface thereof at the temperature required. Those parts of the sheet material not in contact with the cold mold surface will still be plastic enough to expand until they are also chilled and hardened by contact with the mold surface.

For a detailed explanation of the process and apparatus reference will be made to the accompanying drawing in which Fig. 1 is a sectional view of a suitable mold and expansion chamber for shaping an airplane cockpit cover, taken on line I—I of Fig. 2, and Fig. 2 is a cross-section of the apparatus taken on line II—II of Fig. 1.

In the drawing the numeral 2 indicates a pressure chamber enclosed on three sides by the walls 3 and on the remaining sides by the thermoplastic sheet material 4 which is to be shaped. About the edges of the walls 3 extends a continuous flange 5 and 5a adapted to coact with flange 6 and straps 7 to clamp the plastic sheet in place. A gasket 20 between flanges 5 and 5a and the plastic sheet 4 makes a liquid-tight joint at all edges of the pressure chamber. No gasket is employed between the straps 7 and the plastic sheet and the air present in the mold cavity can escape at this point and between the flange and the mold block where there is no tight joint. The flanges 5 and 6 and straps 7 are held in position to clamp the plastic sheet by clamping means such as the bolts 8 and 8a. A hollow or channeled mold block 9 adapted to fit snugly at the edges of the pressure chamber is fastened to the flanges 6 by suitable means such as cap screws 10. The pressure chamber is equipped with inlet and outlet pipes 11 and 12. The inlet pipe carries a valve 13 and the outlet pipe a thermometer 14, a pressure gage 15 and a pressure control valve 16. The hollow mold block 9 is also equipped with inlet and outlet pipes 17 and 18.

The apparatus operates in the following manner:

A sheet of plastic of the desired thickness, for example a sheet of polymerized methyl methacrylate, is softened sufficiently by dipping in hot water or otherwise, so that it can be easily bent to conform to the shape of the periphery of the walls 3. It is then put in place and assumes the position indicated by reference numeral 4. The straps 7 are then put in position and the sheet is clamped between them and the flange 5a by means of bolts 8a. The mold block 9 carrying the flanges 6 is then placed in position and tightly clamped to the edge of the plastic sheet by means of bolts 8 and flange 5. Cold water is now circulated through the mold block entering at pipe 17 and leaving at pipe 18. A warm fluid is now forced into the pressure chamber through valve 13 and pipe 11. When the warm fluid fills the chamber, the pressure control valve is set at the desired pressure and the flow of hot fluid regulated by valve 13 so as to maintain the pressure and the desired temperature as indicated by the thermometer 14.

At the temperature employed the pressure of the hot fluid expands the plastic sheet until its outer surface approaches the cold mold surface 19. When it is still approximately 1/16" away from the surface, the heat loss from the sheet becomes so rapid that it is cooled below its softening point. It thus has time to become hard before it is in actual contact with the mold and the surface texture of the mold is not impressed upon the sheet. Those parts of the sheet farther away from the cold mold surface are still warm enough to flow and they continue to expand until they too are chilled and set by the cold mold.

As soon as the expansion is complete, which usually requires three to ten minutes, depending on the size and shape of the piece, the temperature of the hot liquid is reduced to the point where the plastic material becomes rigid enough to retain its shape. The time of pressing is not critical. No damage is done by continuing the pressing for a considerable time beyond that required, as the heat loss from the sheet in close proximity to the mold is too great to allow it to reach its softening point. The further stretching is prevented. The sheet is actually molded against a film of cold air rather than in contact with the mold itself. The pressure is then released, the liquid drained out and the mold opened to permit removal of the shaped piece.

In this manner curved pieces of various shapes can be made having perfectly polished surfaces which do not disperse any of the light falling on them but permit it to pass through without distortion.

Any suitable fluid which has no effect on the plastic material can be used for the expansion. Kerosene has been found very suitable for shaping methyl methacrylate polymers. The pressure required for expansion will vary with the thickness and plasticity of the material at the temperature of operation. For example, when a sheet of polymerized methyl methacrylate about one-eighth of an inch thick is being shaped, pressures of about five pounds per square inch at temperatures of 100° to 110° C. are ample and are not great enough to mar the surface when it is chilled to about 20° to 30° C. After completion of the expansion the expanding medium should be cooled sufficiently to chill the sheet to a point where it will retain its shape on removal from the mold. For methyl methacrylate polymers this is about 50° C. although no harm is done if it is cooled to 20° or 30° C.

It is understood that other plastics in sheet form besides the methyl methacrylate polymer specifically mentioned can be used and naturally the conditions of time, pressure and temperature will have to be varied according to the specific properties of the particular plastic. The temperature of the pressing fluid and the mold are so chosen that the heat flow through the sheet will allow the outer surface to reach its softening point when some distance removed from the mold, but not when a mere film of air separates them. The pressure is chosen sufficiently high to stretch the material at the softening temperature employed. The process is particularly useful in forming articles such as cockpit covers from methyl methacrylate polymers, other acrylic, methacrylic or vinyl polymers, Celluloid, cellulose acetate plastics, etc.

It is obvious that many variations can be made by those skilled in the art without departing from the scope of the invention as defined in the following claims.

I claim:

1. The process of shaping organic thermoplastic sheet material into three dimensional curves which comprises clamping a sheet of said material between the parting surfaces of a mold, heating the sheet and applying pressure to one side thereof by means of a heated liquid to stretch the sheet into the mold cavity and chilling the stretched sheet as it comes in close proximity to the surface of the mold cavity.

2. The process of shaping organic thermoplastic sheet material of the group consisting of polymeric functional derivatives of acrylic and methacrylic acids which comprises clamping a sheet of said material between the parting surfaces of a mold, heating the sheet and applying pressure to one side thereof by means of a heated liquid to stretch the sheet into the mold cavity and chilling the stretched sheet as it comes in close proximity to the surface of the mold cavity.

3. The process of shaping a sheet of polymeric methyl methacrylate into three dimensional curves which comprises clamping a sheet of said material between the parting surfaces of a mold, heating the sheet to temperatures of about 100° to about 110° C. and applying pressure to one side thereof by means of a heated liquid to stretch the sheet into the mold cavity and chilling the stretched sheet as it comes in close proximity to the surface of the mold cavity.

EDWARD L. HELWIG.